United States Patent
Kim et al.

(10) Patent No.: US 7,584,280 B2
(45) Date of Patent: Sep. 1, 2009

(54) SYSTEM AND METHOD FOR MULTI-MODAL CONTEXT-SENSITIVE APPLICATIONS IN HOME NETWORK ENVIRONMENT

(75) Inventors: Doo Hyun Kim, Kyungki-do (KR); Sung Ho Ahn, Daejeon (KR); Ji Young Kwak, Kwangju (KR); Eun Ryung Lee, Daejeon (KR); Ji Yong Kim, Daejeon (KR); Dong Myung Sul, Daejeon (KR); Joseph C. Vinod, Bangalore (IN)

(73) Assignee: Electronics and Telecommunications Research Institute, Daejeon (KR)

( * ) Notice: Subject to any disclaimer, the term of this patent is extended or adjusted under 35 U.S.C. 154(b) by 712 days.

(21) Appl. No.: 10/987,870

(22) Filed: Nov. 12, 2004

(65) Prior Publication Data

US 2005/0283532 A1 Dec. 22, 2005

Related U.S. Application Data

(60) Provisional application No. 60/520,214, filed on Nov. 14, 2003.

(30) Foreign Application Priority Data

Nov. 11, 2004 (KR) .................. 10-2004-0092105

(51) Int. Cl.
*G06F 15/13* (2006.01)
(52) U.S. Cl. ............. 709/226; 709/202; 709/223; 709/224; 710/36; 711/150
(58) Field of Classification Search ............. 709/202, 709/223, 224, 226; 710/36; 711/150
See application file for complete search history.

(56) References Cited

U.S. PATENT DOCUMENTS

| | | | |
|---|---|---|---|
| 5,968,127 A * | 10/1999 | Kawabe et al. | 709/226 |
| 6,496,871 B1 | 12/2002 | Jagannathan et al. | |
| 2002/0089544 A1* | 7/2002 | Jahn et al. | 345/778 |
| 2002/0178344 A1* | 11/2002 | Bourguet et al. | 712/1 |
| 2003/0046401 A1 | 3/2003 | Abbott et al. | |
| 2003/0163311 A1* | 8/2003 | Gong | 704/250 |

FOREIGN PATENT DOCUMENTS

JP 2001-306199 11/2001

* cited by examiner

*Primary Examiner*—Jinsong Hu
(74) *Attorney, Agent, or Firm*—Blakely, Sokoloff, Taylor & Zafman LLP

(57) ABSTRACT

A system and method for multi-modal context-sensitive applications in a home network are provided. The system includes an input processing agent classifying inputs from a predetermined input device based on at least one criterion selected from the group consisting of an input block, an input type, a priority, and ranking and then outputting the classified inputs; an input collaboration agent performing real-time analysis on each of the inputs fed by the input processing agent to obtain a pre-defined output action for an input type corresponding to each input based on a user's context and performing a probabilistic inference on the inputs fed by the input processing agent to obtain a possible output action based on the user's context; and an agent server obtaining an output resource, which is available in the home network and corresponds to the user's context, based on the output action obtained by the input collaboration agent.

12 Claims, 17 Drawing Sheets

FIG. 13

| PROFILE | INPUT TYPE | PRIORITY | INPUT DEVICE | ENABLED/DISABLED |
|---|---|---|---|---|
| PRIVATE | SPEECH | 0 | PDA | ENABLED |
| | | | PC-DOOHYUN | DISABLED |
| | | | PC-VINOD | DISABLED |
| | | | NOTEBOOK-AHN | DISABLED |
| | | | MICROPHONE | DISABLED |
| | | | CAMERAPHONE | DISABLED |
| | | | WEBCAM | DISABLED |
| | | | ......... | DISABLED |
| | CAMERA | 1 | PDA | DISABLED |
| | | | PC-DOOHYUN | ENABLED |
| | | | PC-VINOD | ENABLED |
| | | | NOTEBOOK-AHN | ENABLED |
| | | | SURVEILLANCE | ENABLED |
| | | | CAMERAPHONE | ENABLED |
| | | | WEBCAM | ENABLED |
| | | | ......... | DISABLED |
| | LOCALIZATION | - | SURVEILLANCE | ENABLED |
| | | | CAMERAPHONE | ENABLED |
| | | | WEBCAM_1 | ENABLED |
| | | | WEBCAM_1 | ENABLED |
| | | | ......... | DISABLED |
| | TEXT | - | PDA | ENABLED |
| | | | PC-DOOHYUN | DISABLED |
| | | | PC-VINOD | DISABLED |
| | | | NOTEBOOK-AHN | DISABLED |
| | | | MICROPHONE | DISABLED |
| | | | CAMERAPHONE | DISABLED |
| | | | WEBCAM | DISABLED |
| | | | ......... | DISABLED |
| | OTHER INPUTS CONFIGURED FOR THE USER | - | | |
| | RESERVED | | | |
| FAMILY | SIMILARLY USERS CAN CONFIGURE MULTIPLE CAMERA AND LOCALIZATION INPUTS BUT ONLY ONE DEVICE FOR SPEECH OR TEXT INPUT. | | | |
| GENERAL | | | | |
| OTHER | | | | |
| USERS CAN DEFINE THEIR OWN PROFILES THROUGH CONFIGURATION | | | | |

SmartPhone Screen Area

SYSTEM AND METHOD FOR MULTI-MODAL CONTEXT-SENSITIVE APPLICATIONS IN HOME NETWORK ENVIRONMENT

This application claims the priorities of U.S. Provisional Application No. 60/520,214, filed on Nov. 14, 2003 in the United States Patent and Trademark Office, and Korean Patent Application No. 2004-92105, filed on Nov. 11, 2004, in the Korean Intellectual Property Office, the disclosure of which is incorporated herein in its entirety by reference.

BACKGROUND OF THE INVENTION

1. Field of the Invention

The present invention relates to a system and method for multi-modal context-sensitive applications in a home network environment, and more particularly, to a system and method for managing multi-modal inputs for diverse users dynamically and adapting to the needs of context in a home network environment.

2. Description of the Related Art

This patent application relates to U.S. Pat. No. 6,496,871 issued to Jagannathan et al and entitled "Distributed Agent Software System and Method Having Enhanced Process Mobility and Communication in a Computer Network" and to U.S. patent Publication No. 2003-0046401 filed by Abbott et al. and entitled "Dynamically Determining Appropriate Computer User Interfaces."

The abstract of Jagannathan's patent discloses a distributed software system and method provided for use with a plurality of potentially heterogeneous computer machines connected as a network. The system may comprise at least one agent comprising a protection domain, wherein the protection domain of the at least one agent resides on at least two of the plurality of computer machines. A plurality of objects is contained within the protection domain of the at least one agent, a first object residing on a first of the at least two computer machines and a second object residing on a second of the at least two computer machines. The objects are selectively movable among the at least two computer machines by a programmer of the system. The first object on the first computer machine may access the second object on the second computer machine in a location-transparent or network-transparent manner; that is, without knowledge of the physical address of the second object on the second computer machine and regardless of the selective movement of either the first object or the second object among the first and second computer machines. The agent is mobile and may migrate, in whole or in part, to any other machine or machines in the network. Each distributed agent may be distributed among one, several or many of the machines of the network. Migration of agents, even during process execution, is straightforward and maintains consistency across the network. Specifically, other agents may continue to access a particular agent after it has migrated without any prior notification to the agents themselves.

This work by Jagannathan et al. primarily deals with the design of a software agent code and its location in a networked communication system. It defines an object task, an agent ID, a task stack, and migration of an agent to a host on a run-time system.

The work by Abbott et al. on "Dynamically Determining Appropriate Computer User Interfaces" involves a method, system, and computer-readable medium for dynamically determining an appropriate user interface (UI) to be provided to a user. In some situations, the determining is to dynamically modify a UI being provided to a user of a wearable computing device so that the current UI is appropriate for a current context of the user. In order to dynamically determine an appropriate UI, various types of UI needs may be characterized based on a current user's situation, a current task being performed, current input/output (I/O) devices that are available, etc. In order to determine characteristics of a UI that is currently optimal or appropriate, various existing UI designs or templates may be characteristics used to identify optimal or appropriate situations, and one of the existing UIs that is most appropriate may then be selected based on the current UI needs.

This work by Abbott et al. facilitates a user of a wearable computing device to dynamically display one of several stored UIs appropriate to context. It defines a method of displaying a dynamic UI based on predefined contexts and uses a UI to select an appropriate UI. However, the work by Abbott only includes pre-defined characterization of the security capabilities of the UI.

SUMMARY OF THE INVENTION

The present invention provides a system and method for managing multi-modal inputs for diverse users dynamically and adapting to the needs of context in a home network environment.

According to an aspect of the present invention, there is provided a system for providing a dynamic user configurable output for multi-modal context-sensitive applications in a home network, including an input processing agent classifying inputs from a predetermined input device based on at least one criterion selected from the group consisting of an input block, an input type, a priority, and ranking and then outputting the classified inputs; an input collaboration agent performing real-time analysis on each of the inputs fed by the input processing agent to obtain a pre-defined output action for an input type corresponding to each input based on a user's context and performing a probabilistic inference on the inputs fed by the input processing agent to obtain a possible output action based on the user's context; and an agent server obtaining an output resource, which is available in the home network and corresponds to the user's context, based on the output action obtained by the input collaboration agent.

According to another aspect of the present invention, there is provided a method of providing a dynamic user configurable output for multi-modal context-sensitive applications in a home network, including classifying inputs from a predetermined input device based on at least one criterion selected from the group consisting of an input block, an input type, a priority, and ranking and then outputting the classified inputs; performing real-time analysis on each of the inputs to obtain a pre-defined output action for an input type corresponding to each input based on a user's context or performing a probabilistic inference on the inputs to obtain a possible output action based on the user's context; and obtaining an output resource, which is available in the home network and corresponds to the user's context, based on the obtained output action.

Accordingly, users can make multi-modal inputs for both user input data and security context, the configuration of a device including user interface can be dynamically changed to adapt to a user's requirements, and an output based on the user's context can be produced.

BRIEF DESCRIPTION OF THE DRAWINGS

The above and other features and advantages of the present invention will become more apparent by describing in detail preferred embodiments thereof with reference to the attached drawings in which:

FIG. 13 illustrates a table of possible input configuration available to a user;

DETAILED DESCRIPTION OF THE INVENTION

Figure 1:
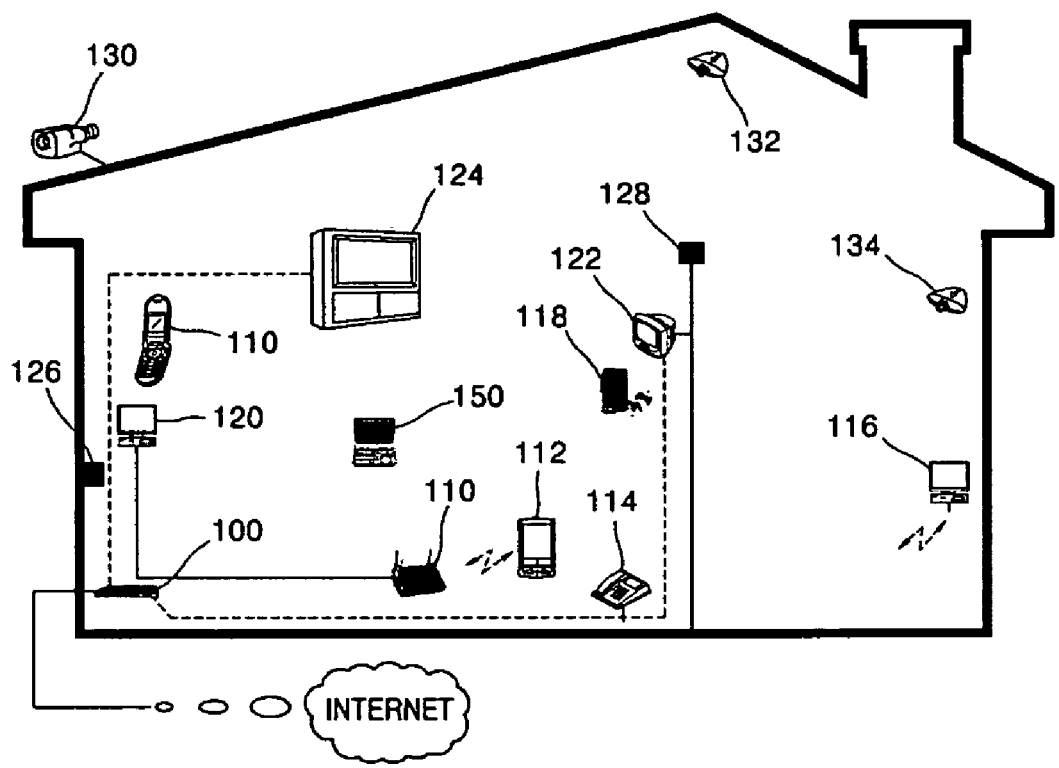
FIG. 1 illustrates a home network environment using a system and method for multi-modal context-sensitive applications according to an embodiment of the present invention.

Hereinafter, preferred embodiments of the present invention will be described in detail with reference to the attached drawings.

An agent is a piece of code that sits on a platform and communicates with an environment through an interface. Agents can be stationary or mobile. A stationary agent only execute on the platform and environment where it is meant to execute. On the contrary, a mobile agent can move from one system to another and execute in another domain or platform.

A home server is developed to play the pivotal role of managing all home network devices and multimedia content services through home networks in a household. The home server can be used as a digital television, surveillance equipment with a camera attached to the home server, and a messaging server as well as a streaming server, a data mining server or a home controller based on a user's needs.

A wide array of input devices is to be facilitated to enhance home networking data traffic. A plethora of possible inputs from diverse devices such as a camera, a microphone, a sketch recognizer, a gesture recognizer and/or text have to be managed simultaneously. Accordingly, the home server has to be enhanced to facilitate multi-modal inputs with multiple integrated user agents working together to facilitate all users at home. Also, an output has to dynamically change based on changes in user context. With the technology trend of decreasing display sizes and ever-increasing array of features available to the user, it is very difficult to display all the features for all users on the shrinking displays. So display has to be adaptive and context-aware to the needs of a user.

Managing multi-modal inputs in a dynamic context-sensitive home environment in which a plurality of inputs can be input changes the existing design of home environment servers. With multiple input and output devices connected to the home server, managing a simple device authentication using a password is not feasible. Also, mobile devices need to be enhanced to support mobile agents and collect a multitude of inputs for user input, localization and security context recognition.

Security in such a dynamic infrastructure is challenging. Conventional security methods are not suitable for managing dynamic context-sensitive user requirements. The present invention provides mobile agents at each interface input device to manage multiple users using mobile agent digital signatures to dynamically adapt to the context. Agents interface through a mobile base agent and a gateway agent and dynamically adapt to the needs of the requirements of a user.

Using mobile agents in the home environment is mainly advantageous in changing user scenarios and adhoc environment where a plethora of devices operate. The mobile agents can asynchronously or synchronously run with the base agent or can run autonomously and can provide an output to the home server. Also, the presence of dynamic devices with significant memory constraint facilitates the mobile agents. The mobile agents need to be downloaded based on a corresponding device capability. Peer agents can be run from the base agent. The mobile agents encapsulate a variety of other protocols and can operate seamlessly with any base network topology to provide inputs and security context information to the base agent. A mobile agent may be distributed to several nodes in a network. The mobile agent is dynamically loaded to a corresponding device based on the configuration and capability of the device. Input sub-agents are dynamically activated based on user configuration and device features. For a device that has a microphone input, a camera input, and a text input; a speech input sub-agent, a gesture input sub-agent, and a text input sub-agent are loaded to the device.

FIG. 1 illustrates a home network environment using a system and method for multi-modal context-sensitive applications according to an embodiment of the present invention. Referring to FIG. 1, a home server 100 provided at home is connected to an external world through Internet and public switched telephone network (PSTN). The home server 100 connects to a plurality of home devices using diverse communication facilities such as a local area network (LAN), a wireless LAN, and a Bluetooth. The home devices connected to the home server 100 may be divided according to a connection unit as follows. Firstly, a personal digital assistant (PDA) 112, a wireless phone 114, a computer 116, and a game station 118 are connected to the home server 100 via an access point 110 of the wireless LAN. Secondly, a computer 120, a TV 122, a projector 124, a plurality of sensors 126 and 128, and a plurality of surveillance cameras 130, 132, and 134 are connected via the wired LAN. Besides, a mobile phone 140, a computer 150 equipped with a Bluetooth module, etc. may be connected to the home server 100.

A user may configure a plurality of input devices on a home network having such profile. The home server 100 acts as a central processing unit for operations of all home devices 112 through 150. The user may configure an output displayed on a personal display device or the projector 124 attached to the home server 100. The output is displayed on a single display or a plurality of displays based on a user profile or a user configuration.

Let us envision a scenario wherein the user has configured the output to be displayed on all devices when the user is all alone at home. Suppose that an intruder enters the home or watches through a window, a display has to dynamically adapt to a change into personal profile settings based on the user configuration. Presence of the intruder may be detected using diverse input devices such as the cameras 130, 132, and 134 and/or sensors 126 and 128 that send information over the Bluetooth or wireless LAN to the home server 100. Such a home network structure facilitates the user to configure many security agents that co-operate to detect intrusion using localization inputs from cameras, sensor inputs from sensors, and biometric and voice recognition in addition to conventional password schemes.

If the same scenario is further broadened, the user could overlook a family member. A display dynamically detects a family profile and displays the family profile customized by the user. Here, mobile agents and a hybrid collaboration architecture are used to determine the best possible case of action.

Figure 2:
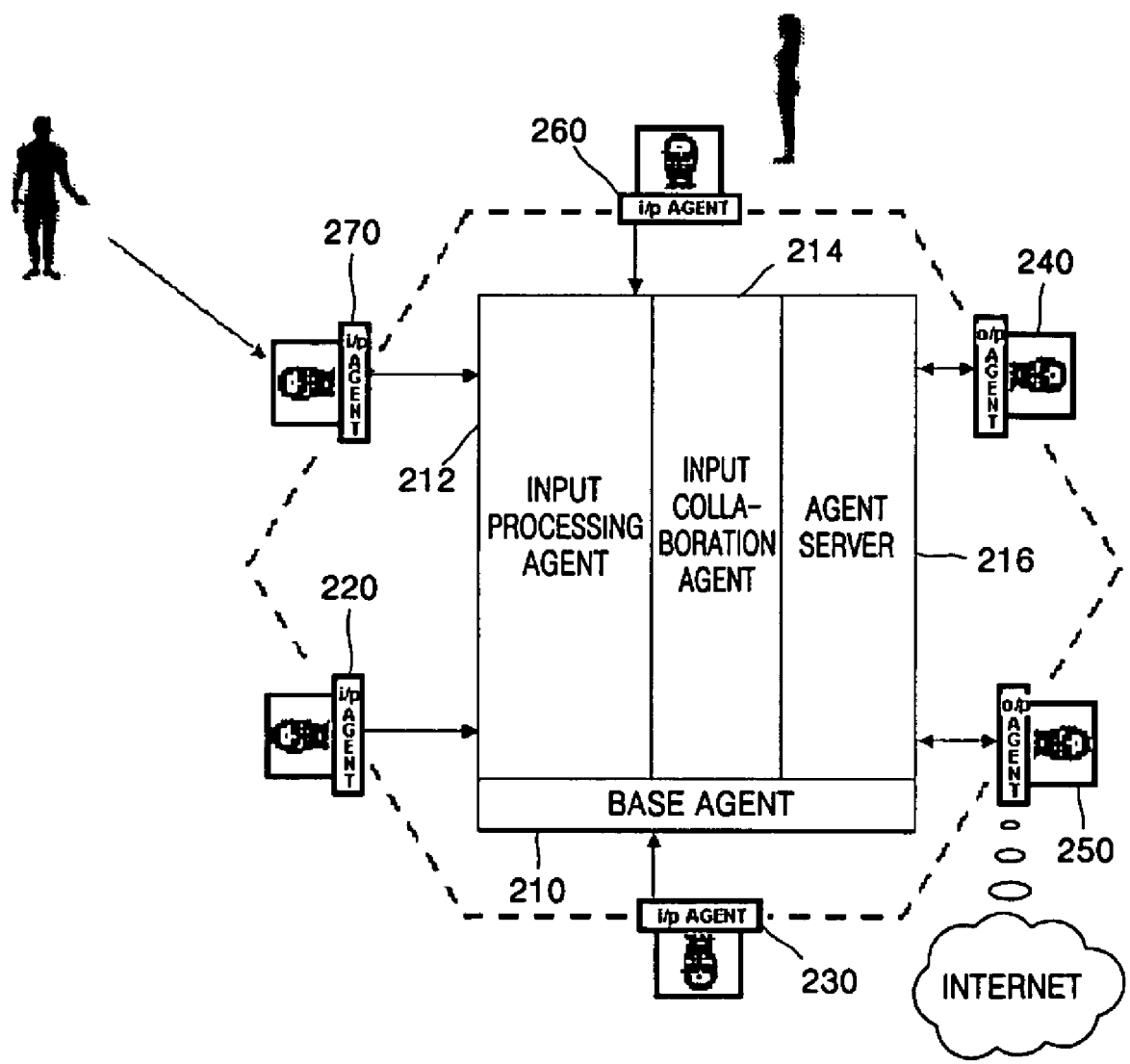
FIG. 2 illustrates a basic architecture of a system for multi-modal context-sensitive applications in a home network environment according to an embodiment of the present invention.

FIG. 2 illustrates a basic architecture of a system 200 for multi-modal context-sensitive applications in a home network environment according to an embodiment of the present invention. Referring to FIG. 2, the system 200 includes a base agent 210, a motile agent 220, an input agent 230, a replicated base agent 240, a gateway agent 250, a speech sub-agent 260, and a gesture sub-agent 270.

The base agent 210 is located within the home server 100. An agent platform resides in the base agent 210. The basic architecture shown in FIG. 2 enables a device to accept an input from the input agent 230 and connect an output to the mobile agent 220 in a corresponding device. The output may be forwarded to the replicated base agent 240 or the gateway agent 250 based on a request. The replicated base agent 240 facilitates replication of an agent state and value in a case of failure of the home server 100. The gateway agent 250 connects to an external Internet domain or a PSTN through well-defined interfaces. The gateway agent 250 is vital to the remote operation of the mobile agent 220 from the external world, e.g., a user's virtual office embodied on the user's mobile device. However, this operation is not enabled by default and is only available on user configuration of trusted devices.

The mobile agent 220 can be located on the base agent 210 or on the replicated base agent 240 based on user configuration. For example, when a user works on a cordless phone which has an interface to the home server 100, the base agent 210 does not accept any inputs other than text Inputs. The user can configure a camera input agent at the home server 100 to accept inputs for the user's profile due to the dynamic mobility of the mobile agent 220. Several input agents 230 can be configured for a device including a camera input for both of biometric recognition and localization, a text input for a normal behavioral pattern, a gesture input for action-based input recognition, and a sensor for both of localization and other information.

The speech sub-agent 260 may be activated for only the user's profile home device by default. The speech sub-agent 260 can be modified to accept an input from any configurable mobile agent 220 with speech recognition capability, but the user cannot configure more than one device to accept multiple inputs of the same type. The gesture sub-agent 270 can also be used for both of recognition and input to the mobile agent 220 in the similar manner as the speech sub-agent 260.

The system 200 facilitates users to configure multi-modal inputs for dynamic adaptive recognition and usage. A user can configure several profiles that define the user's characteristics and each profile can adapt dynamically based on context-sensitive data fed to the input agent 230. The data is processed dynamically and the system 200 adapts to the changed user and context-sensitive conditions.

Multi-modal inputs are fed to an input processing agent 212 which categorizes the inputs into an input type, an input category, and an input value, which accepts an input string, and which feeds similar inputs to an input collaboration agent 214. The input collaboration agent 214 processes a series of similar inputs based on both of a real-time reasoning and analysis and a hybrid collaboration architecture. Two possible action scenarios for input cases are stored and forwarded to an agent server 216. The agent server 216 compares outputs and takes the best possible action based on a comparator algorithm. The agent server 216 feeds the best possible output to an output device.

Figure 3:
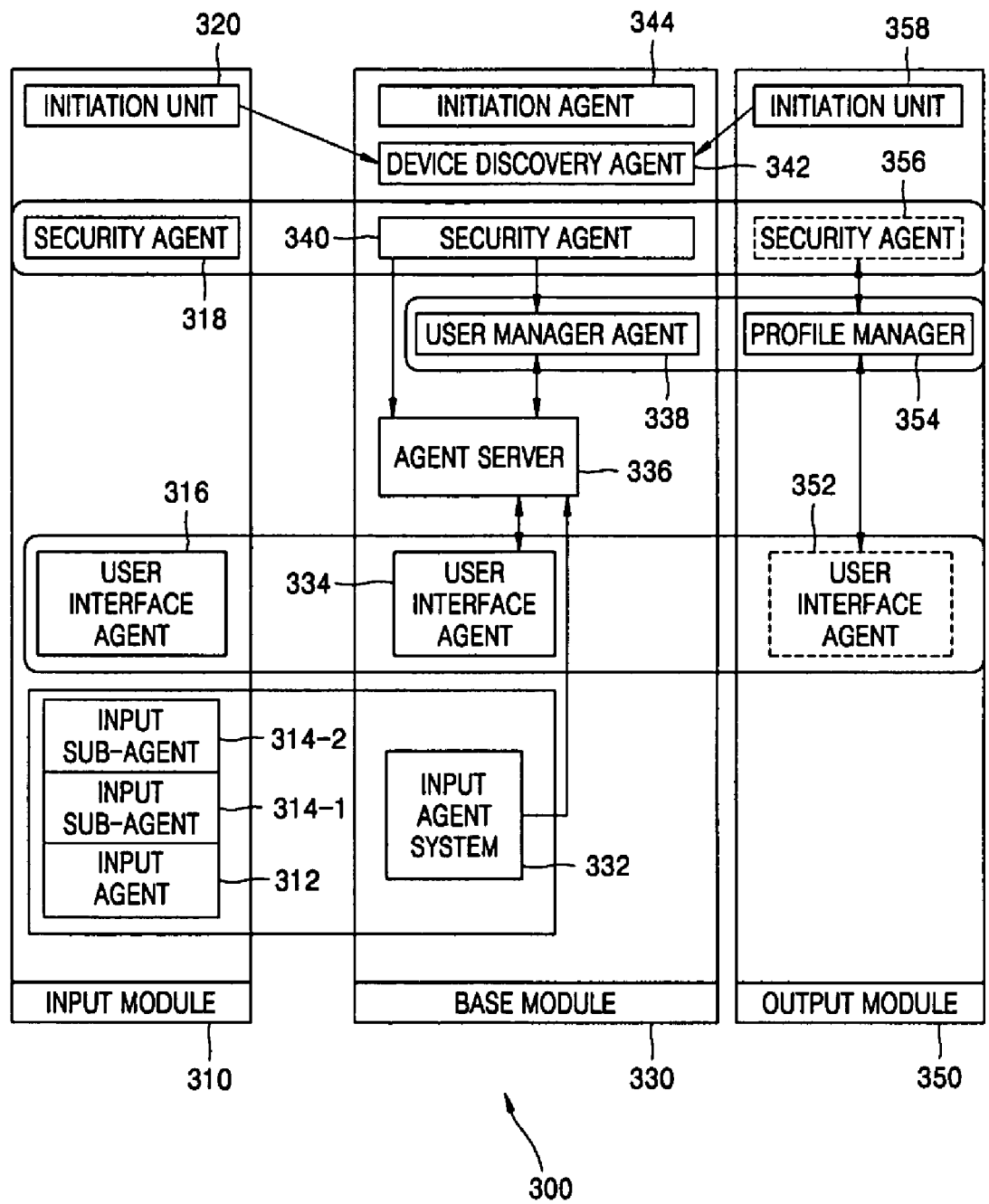
FIG. 3 illustrates a system, having all individual modules for a home-based operation, for multi-modal context-sensitive applications in a home network environment according to an embodiment of the present invention.

FIG. 3 illustrates a system 300, having all individual modules for a home-based operation, for multi-modal context-sensitive applications in a home network environment according to an embodiment of the present invention. Architecture for connection to a gateway agent is not defined in FIG. 3. The system 300 includes an input module 310, a base module 330, and an output module 350.

The input module 310 is a device that accepts an input and the output module 350 is a device that displays an output. The input module 310, the output module 350, and the base module 330 may be on the same device or on separate devices. For example, when accepting an input from a PDA and displaying an output on a projector connected to a home server, the PDA is the input module 310 and the output module 350 is located in the home server. The projector is physically connected to the home server on a physical port. Software for the output module 350 is located in the base module 330, where an agent platform is located. Similar scenarios prove that the option of having dynamic mobile agents in a home environment network facilitates a dynamic adaptable operation. A default profile uses the input module 310 and the output module 350 on the same device and remotely interacts with the base module 330 on the home server.

The input module 310 activates an initiation unit 320 on booting an input device. The input module 310 sends a signal to a device discovery agent 342 that runs continuously. Similarly, an initiation unit 358 included in the output module 350 is recognized by the device discover agent 342 which maintains a list of input and output devices active for current user configuration and the whole system 300.

An initiation agent 344 included in the base module 330 loads a platform and a class loader. A security agent 340 included in the base module 330 is a mobile agent that activates on the device discovery agent 342 and works to identify a current user. Different security sub-agents may be configured to operate for a device. The security sub-agents work as multi-modal inputs to recognize a user and loads default configuration for the multi-modal inputs. The security agent 340 informs a user manager agent 338 of a current user context and continuously works to inform the user manager agent 338 of dynamically changing security contexts. The security contexts are defined to be tightly integrated to user profiles.

A security agent 318 included in the input module 310 uses different security sub-agents configured for a user profile to identify changes in security context. Security sub-agents configured for the input device include a sensor sub-agent, a camera localization sub-agent, a speech recognition sub-agent, a biometric recognition sub-agent, a fingerprint authentication sub-agent, and a text password security sub-agent. The output module 350 has a security agent 356 selectively. As the function of the security agent 356 is similar to that of the security agent 318, detailed description will be omitted.

Various types of security configurations are tightly integrated into a user profile and interact together with a profile manager 354, i.e., an instance of the user manager agent 338 in the output module 350 to dynamically operate on security contexts defined to operate for the user profile. The user manager agent 338 is tightly coupled to an agent server 336 to get an output based on a current user profile and context state.

The agent server 336 is pivotal to the operation of the system 300 and interacts with all other agents. A replication model is thereby facilitated to enable redundancy and to eliminate failures. The agent server 336 also keeps a record of all devices under its domain by receiving information from the device discovery agent 342. Replication interface to a replicated base agent or any peer base agent will be explained later. Interface to a gateway agent is similar to peer agent interface.

On successful authentication of a user, a corresponding default user interface is initially loaded to facilitate real-time output and security reasons. The user can configure his/her profile to facilitate context-based output to be displayed on changing his/her profile settings. A user interface agent 334 included in the base module 330 stores all user contexts and profiles for the users and facilitates the users to define a dynamic profile that is system-defined or to define and add new profiles and contexts based on the users' needs. As the function of the user interface agents 316 included in the input module 310 is similar to that of the interface agents 344 included in the base module 330, detailed description will be omitted. Meanwhile, output module 350 has a user interface agents 352 selectively. The user interface agent 334 subsequently loads all of the input mobile agents to a mobile device.

An input agent 312 loaded is based on a user configuration. The input agent 312 dynamically loads different input sub-agents 314-1 and 314-2 based on a corresponding input agent device configured for the user and a device capability for the input device. Unlikely, only one input sub-agent of an input type may be loaded. An input agent system 332 consists of an input processing agent and an input collaboration agent that have been described with reference to FIG. 2.

Figure 4:
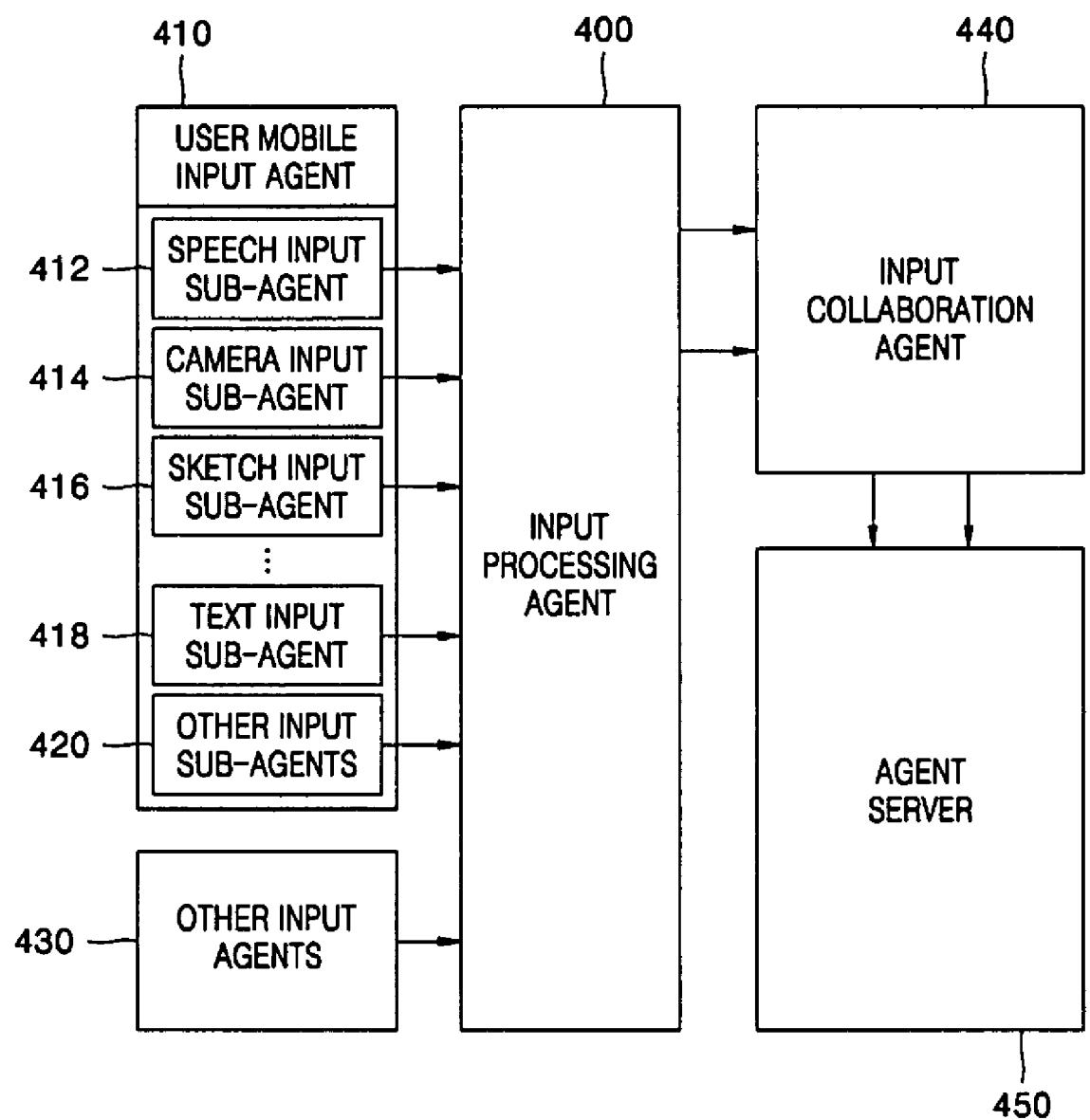
FIG. 4 illustrates connection between an input processing agent and a user mobile input agent.

FIG. 4 illustrates connection between an input processing agent 400 and a user mobile input agent 410. Referring to FIG. 4, the user mobile input agent 410, other input agents 430, and an input collaboration agent 440 are connected to the input processing agent 400. The other input agents 430 can be configured to operate on behalf of the user mobile input agent 410. A speech input sub-agent 412, a camera input sub-agent 414, a sketch input sub-agent 416, a text input sub-agent 418, and other input sub-agents 420 are configured for a user based on a corresponding device capability and provide inputs to the input processing agent 400.

The input processing agent 400 collects all multi-modal inputs configured for user inputs and assigns priorities based on an input type. The priorities based on the input type are defined by the user. Configuration of a single input enables the system to behave as a normal single-input device. Priority 0 is the highest priority and is assigned to the text input sub-agent 418 by default. The user can modify the user's profile settings to change the corresponding priorities for different input types configured for the user's mobile device. The input processing agent 400 also assigns system-defined rankings for the inputs received by an agent. The rankings are given on a rating of 0-10 based on the quality of input received at an interface.

The input processing agent 400 then feeds an input with the highest priority and the highest ranking to the input collaboration agent 440 and also feeds the other multi-modal inputs and their rankings and priorities to the input collaboration agent 440. The input collaboration agent 440 then works on these inputs, which have been fed by the input processing agent 400, based on a pre-analysis and a collaborative algorithm with probabilistic inherence to produce the most favorable action. Thereafter, the input collaboration agent 440 feeds an output resulting from real-time processing and an output resulting from multi-modal analysis to the agent server 450 for further actions and resource output. An architecture of the agent server 450 for processing these inputs will be described later.

Figure 5:
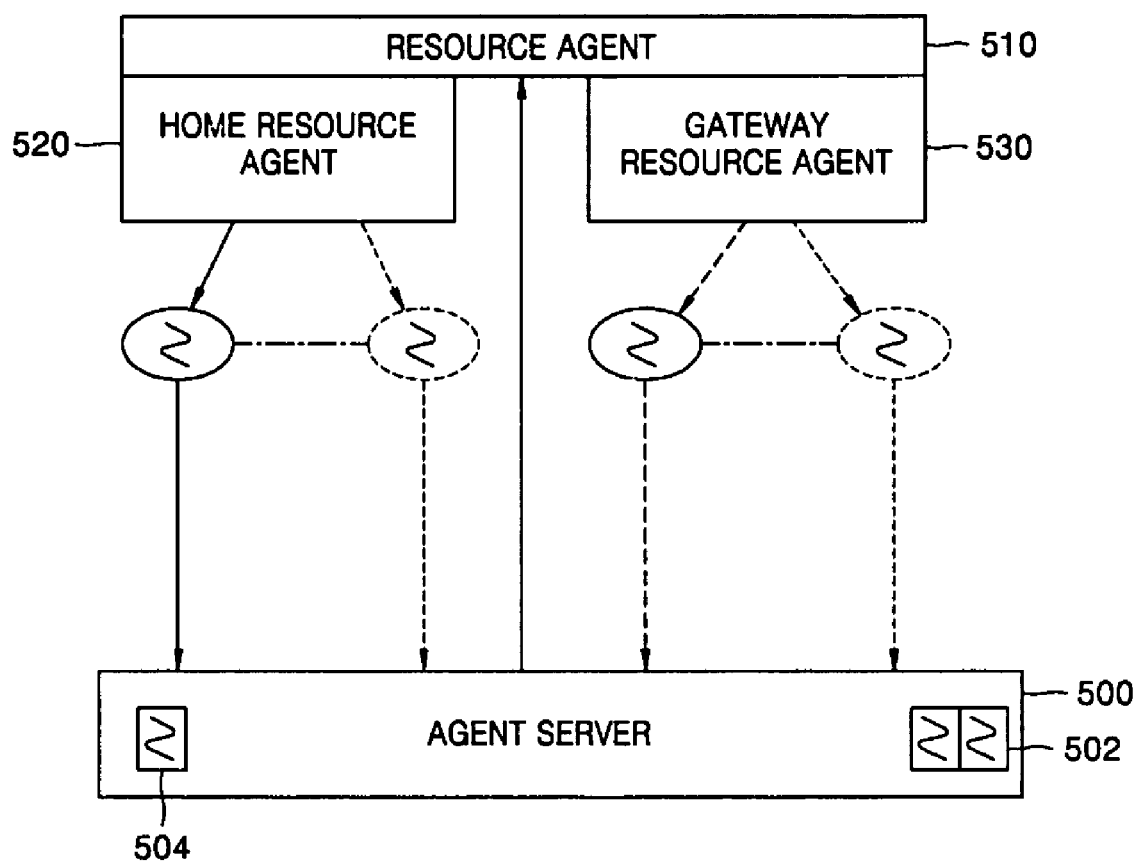
FIG. 5 illustrates a procedure invoked by an agent server to contact and obtain resources.

FIG. 5 illustrates a procedure invoked by an agent server 500 to contact and obtain resources. Referring to FIG. 5, the agent server 500 is an agent solely responsible for contact between a home resource agent 520 and a gateway resource agent 530. Based on an output action, the agent server 500 forwards a resource request to a resource agent 510.

The resource agent 510 verifies if an output is available within its home network domain to request the home resource agent 520. In addition, the resource agent 510 forwards a resource request to the gateway resource agent 530 that gets the corresponding resource from an external world. The resource agent 510 forks a thread to make a requested resource available to the agent server 500 and sends a requested output back to the agent server 500 using a response method. The agent server 500 may deliberate several threads to respond to a sequence of requests. The agent server 500 maintains the status of its requests in a thread information base 502 and keeps a request thread active until it receives an output. The agent server receives a complete response to a corresponding request query 504. Such resource acquisition procedure is not just used between the agent server 500 and the home resource agent 520 and/or the gateway resource agent 530.

Figure 6:
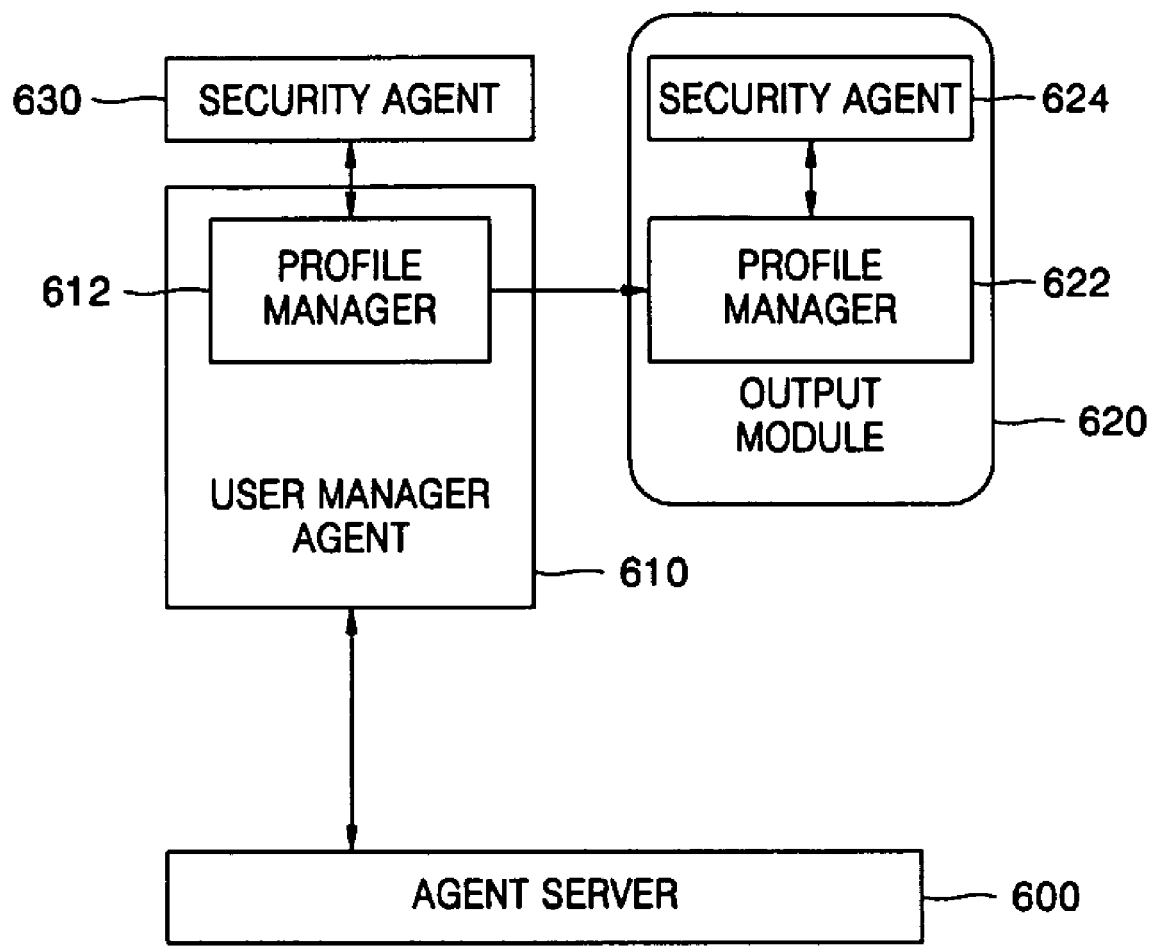
FIG. 6 illustrates interactions between the agent server using a user manager agent and an output module.

FIG. 6 illustrates interactions between an agent server 600 using a user manager agent 610 and an output module 620. Referring to FIG. 6, the user manager agent 610 and the agent server 600 interact with each other over a tightly coupling interface to facilitate dynamic changes in a user profile and corresponding changes in an output action. A profile manager 612 in the user manager agent 610 assists in managing user profiles based on the user's preferences. The user profiles vary dynamically based on a corresponding context.

A security agent 630 connected to the user manager agent 610 notifies the profile manager 612 of any change in security context and thereby enables the user manager agent 610 to dynamically adapt to the context-sensitive changes. A profile manager 622 in the output module 620 stores different outputs based on context profiles authorized for the user and thereby can easily adapt to highly dynamic changes in a display environment. The adaptive dynamic change may be disabled or enabled by the user based on his/her preferences. A security agent 624 of the output module 620 notifies the profile manager 622 of any change in security context.

Figure 7:
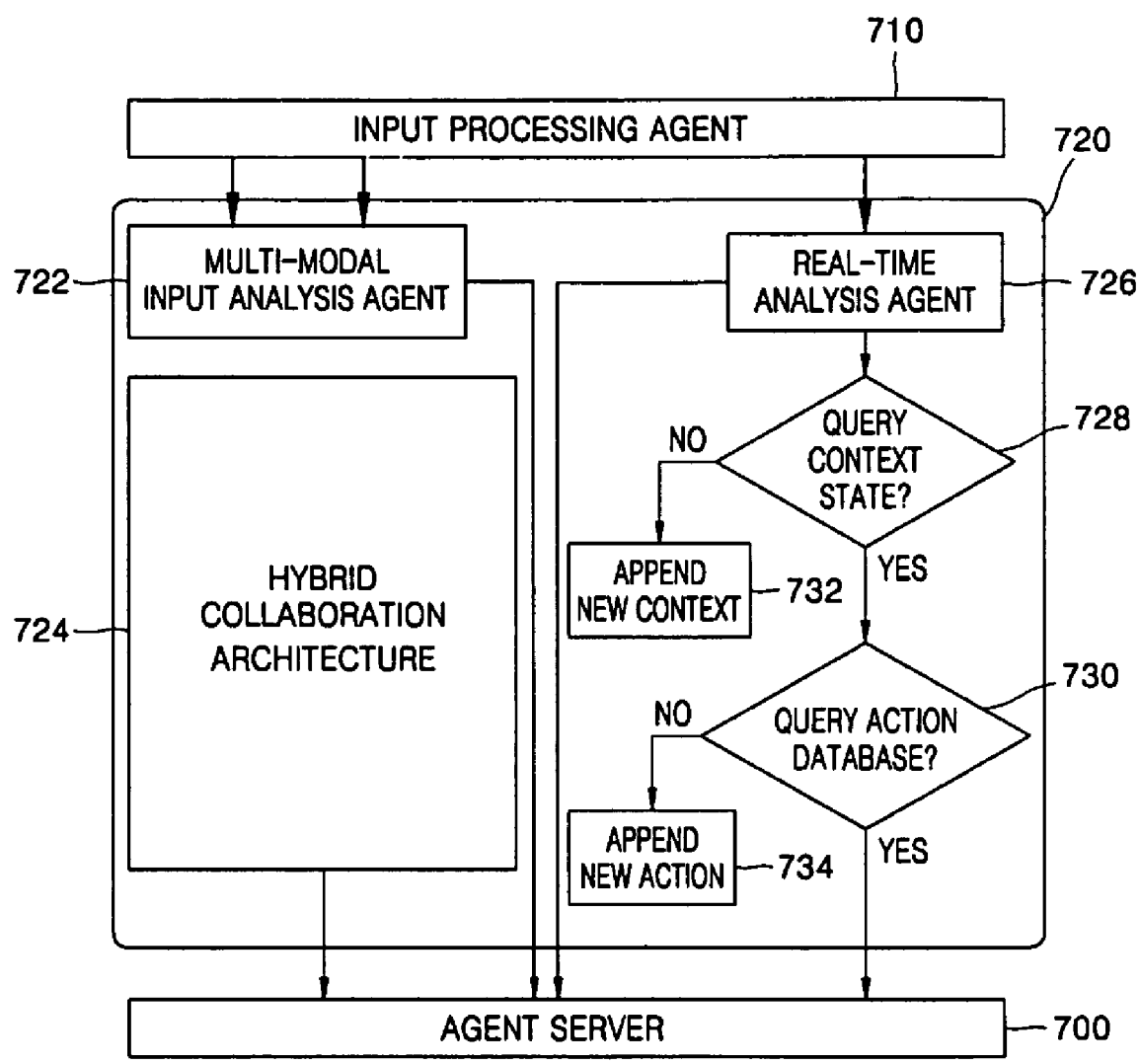
FIG. 7 illustrates an operation of an input collaboration agent upon receiving inputs from an input processing agent.

FIG. 7 illustrates an operation of an input collaboration agent 720 upon receiving inputs from an input processing agent 710. Referring to FIG. 7, the input processing agent 710 categorizes inputs based on an input block, an input type, a priority, and a ranking and sends an input with the highest priority and the highest ranking to both of a real-time analysis agent 726 and a multi-modal input analysis agent 722.

The real-time analysis agent 726 accepts an input with the highest priority and the highest ranking for an input block from the input processing agent 710 and first classifies the input based on an input category. Thereafter, the real-time analysis agent 726 verifies the real-time analysis information management base to verify a pre-defined output for a corresponding input type based on the input category, an input value, a previous input category, a previous input value, a previous output action, a current context state, and a previous context state. If a corresponding entry is found in the real-time analysis information management base, the previous output action is defined to be the current output action. An output action of the real-time analysis agent 726 is then forwarded directly to an agent server 700 for immediate action. The agent server 700 contacts an appropriate resource based on information that it has and outputs the appropriate resource to an output module. The output resource is then modified to a user's profile context and several profile flavors are maintained in a profile manager. The profile manager then dynamically adapts to security changes to append an exact profile output to the output module.

If the corresponding entry for a queried request is not available in the real-time analysis management information base, a corresponding context state is queried (operation 728). If the context state is available for the corresponding input category and input value, a current context is output. If the context state is not available for the corresponding input category and input value, a new record is created in an input service record to facilitate output details to be appended by the agent server 700 (operation 732). The input service record is a subset of a service record database that will be defined below.

If the current context is returned successfully, an action database is queried for a corresponding action to be taken for the corresponding input and an output that is forwarded to the agent server 700 for resource query (operation 730). If the corresponding action is not found for the input category and input value, a new record is created in the input service record to facilitate output details to be appended by the agent server 700 (operation 734).

Significant part of the operation of the input collaboration agent 720 deals with a hybrid collaboration architecture 724. The input having the highest priority the highest ranking is fed to the multi-modal input analysis agent 722 together with other multi-modal inputs based on input block criteria. The multi-modal input analysis agent 722 has an input event wait queue that accepts other inputs recognized as a part of the input block. The input processing agent 710 assigns input blocks based on input agents configured for the user and accepts inputs from all sub-agents active for a device. Inactive sub-agents provide zero ranking inputs that are not processed further beyond the multi-modal input analysis agent 722. Thereafter, the multi-modal input analysis agent 722 performs a probabilistic inference to query the multi-modal information management base and obtains the best possible action to be taken for a sequence of inputs, a previous action, a similar previous sequence of inputs, and current and previous contexts associated with the inputs. The multi-modal input analysis agent 722 also performs a probabilistic inference on a subsequent possible sequence of inputs. The corresponding action inferred to be the best action based on the current context is fed to the agent server 700 for resource query.

The multi-modal information management base and the real-time information management base are subsets of an information management base. These subsets have similar inherence to that of the input service record from the service record database.

Thereafter, the multi-modal input analysis agent 722 forwards inputs corresponding to the input block criteria to the hybrid collaboration architecture 724 which blocks based on collaboration and parallel processing for the inputs. The detailed structure of the hybrid collaboration architecture 724 will be described later. The hybrid collaboration architecture 724 is based on neural processing and feedback control systems and grows to dynamically adapt based on a current input, a previous input, a current action to be taken, a previous action taken, and other input definitions delivered by input. Such a processing block at the input collaboration agent 720 is critical for processing multi-modal inputs and for performing a dynamic probabilistic inherence of possible subsequent means of input and action. A home server has no significant memory constraints and therefore the above-described elements are located in the home server.

Figure 8:
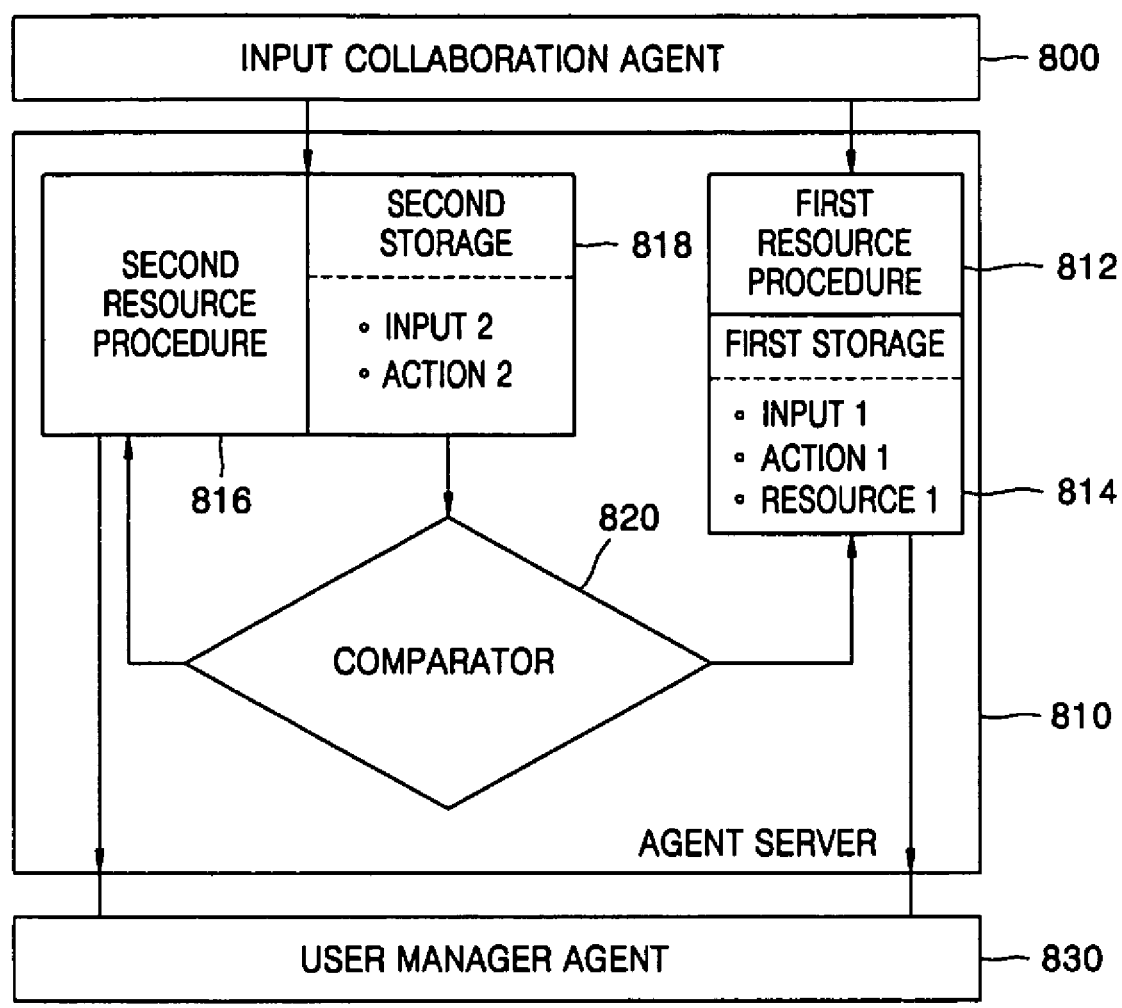
FIG. 8 illustrates operations undertaken in the agent server to process and display the best output for multi-modal inputs.

FIG. 8 illustrates operations undertaken in an agent server 810 to process and display the best output for multi-modal inputs. Referring to FIG. 8, to obtain a corresponding resource through a resource procedure, an input collaboration agent 800 feeds either a real-time pre-analyzed input or a real-time computed input to the agent server 810 which processes real-time inputs or multi-modal inputs received. Information for resources is maintained in an information management base. The details of received inputs and corresponding action to be taken are appended to a service record database. The agent server 810 waits in real-time for the best action output from the multi-modal inputs.

Upon receiving a pre-analyzed multi-modal action or a hybrid architecture defined multi-modal action, the agent server 810 performs the following actions.

The agent server 810 performs the resource procedure to obtain a resource corresponding to an input from the input collaboration agent 800. Simultaneously, a first resource procedure block 812 and a second resource procedure block 816 in the agent server 810 process the real-time computed input and the real-time pre-analyzed input, respectively. A first storage 814 and a second storage 818 are provided to correspond to the first resource procedure block 812 and the second resource procedure block 816, respectively, and store the values of the inputs received from the input collaboration agent 800 and their corresponding actions. A comparator 820 compares the actions corresponding to the input values with an output action obtained from a real-time analysis agent. Here, the comparator 820 may use a best case definition algorithm. The agent server 810 feeds an output obtained as a result of the comparison to a user manager agent 830. If the output action does not differ from criteria defined for the comparison, the comparator 820 requests the first resource procedure block 812 to forward a pre-computed real-time resource to the user manager agent 830. If the comparator 820 finds dis-similarities between the output action and the criteria, a multi-modal output is given precedence over a real-time analysis output. Here, the comparator 820 requests the second resource procedure block 816 to forward a resource computed by a multi-modal procedure to the user manager agent 830.

Figure 9:
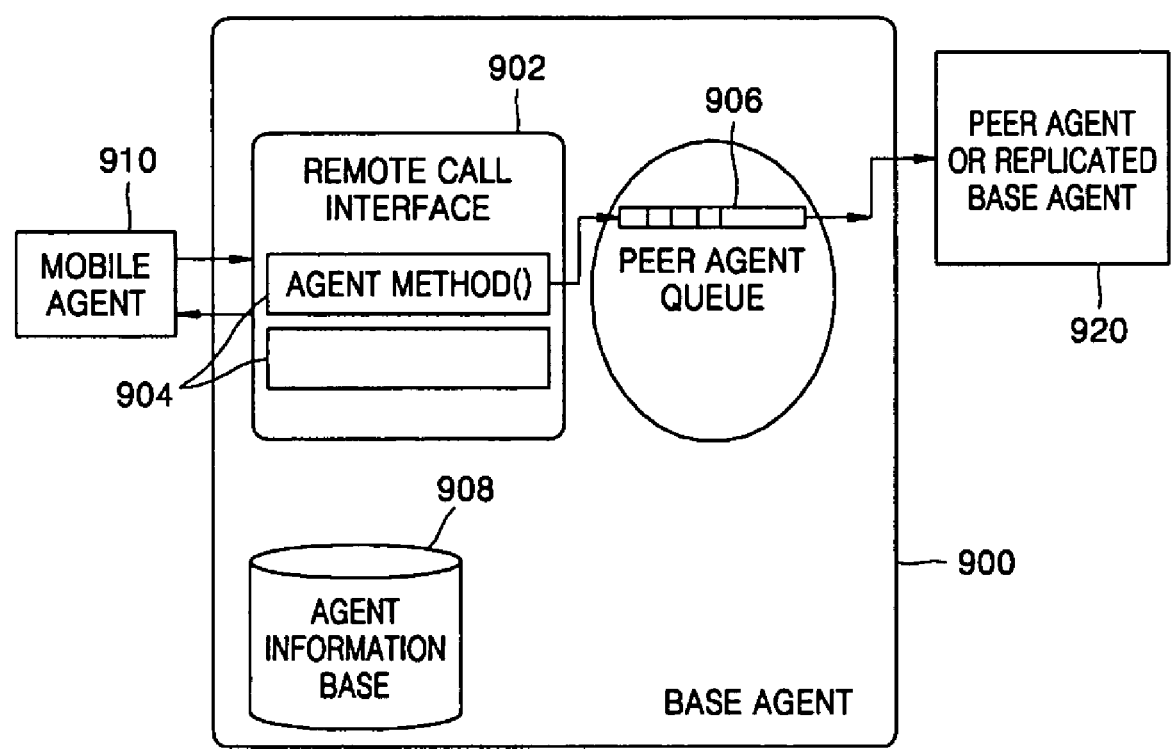
FIG. 9 illustrates interface used by a mobile agent to contact a peer agent and a gateway agent.

FIG. 9 illustrates interface used by a mobile agent 910 to contact a peer agent 920 and a gateway agent. The architecture of the mobile agent 910 defined for a home environment is centralized with a replicated agent for redundancy. A base agent has an agent platform system and may use diverse interfaces for supporting a plurality of devices that may exist in the home environment. The interfaces may be parallel distributed to prevent bottlenecks. The peer agent 920 facilitates parallel operation to manage a multitude of home devices growing dynamically as technology adaptation increases. A user can configure the peer agent 920 for adaptation to highly dynamic conditions based on a network load in the home environment.

An interface to the mobile agent 910 is created using Java/XML. There are several mobile agent methods 904 that are dynamically downloaded to a mobile device based on device capability and/or user configuration in a remote call interface 902. An agent information base 908 manages the states of agents and their locations and available instances. A request to the peer agent 920 on a centralized architecture is managed through a peer agent queue 906, and different queues are used for different peer agents (or replicated base agents) 920. When a gateway agent is connected to the base agent 900 as defined in a default architecture, a gateway agent queue is defined and created for agent inter-process communication. A request to the gateway agent is defined to be a 4-way handshake procedure for security reasons.

Figure 10:
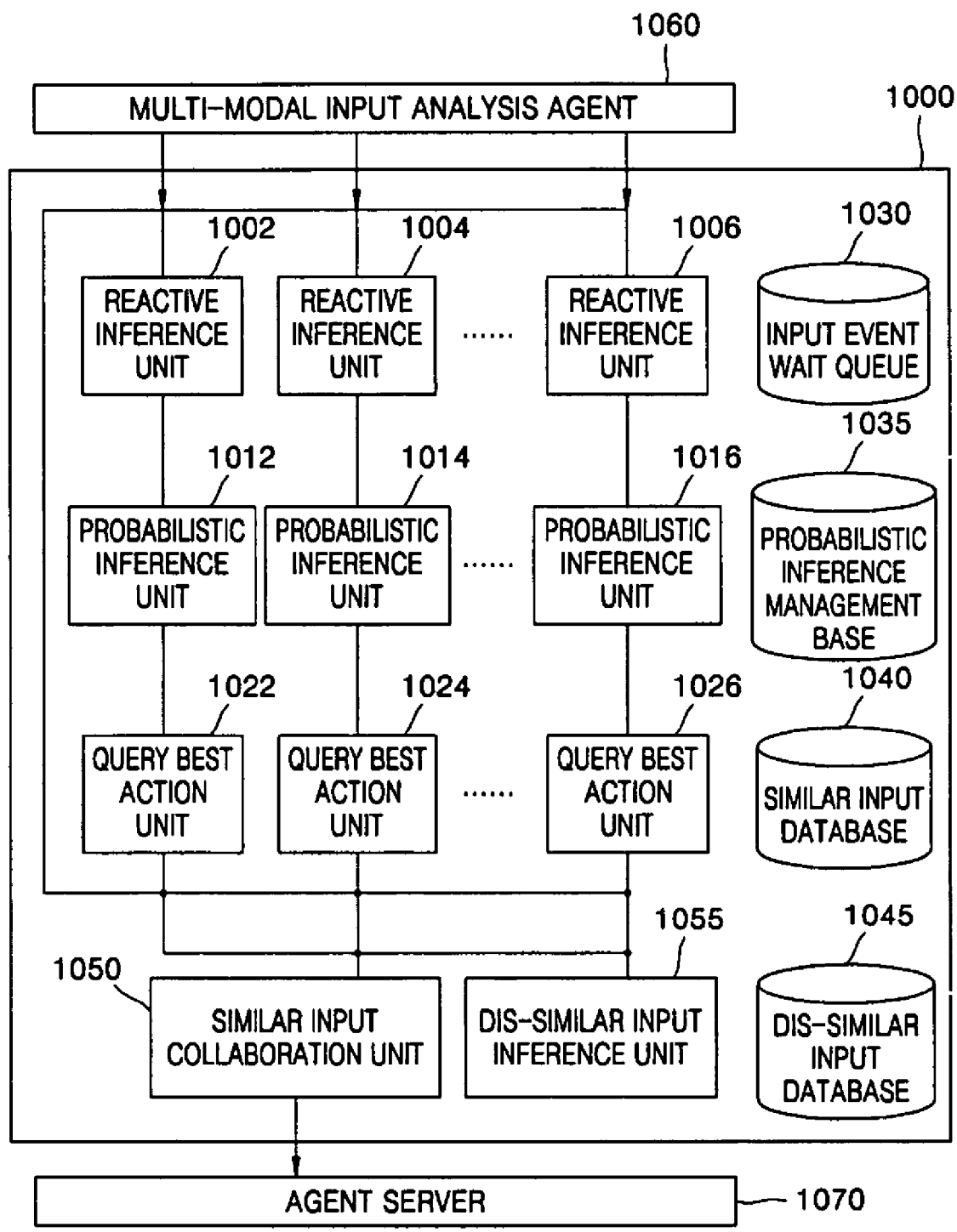
FIG. 10 is a detailed diagram of a hybrid collaboration architecture provided in the input collaboration agent.

FIG. 10 is a detailed diagram of a hybrid collaboration architecture 1000 provided in the input collaboration agent. The hybrid collaboration architecture 1000 accepts inputs based on an input block, an input category, an input type, a current context, and a corresponding input string. The inputs are fed through a series of parallel reactive probabilistic inferences and a corresponding action for each possible input type obtained. The inferences are performed by reactive inference units 1002, 1004, and 1006 and probabilistic inference units 1012, 1014, and 1016. The maximum number of parallel processes is limited by input types configured for multi-modal inputs. Also, a multi-modal input analysis agent 1060 ignores inputs with zero ranking definition. After the inferences, the best possible action is queried sequentially by query best action units 1022, 1024, and 1026. The best possible action is obtained for all possible input types including the latest possible input that has arrived in an input event wait queue 1030 and the previous inputs that are inferred to belong to the input block category in a similar input database 1040. A dissimilar input inference unit 1055 feeds an input that is inferred to be dissimilar to a dissimilar input database 1045 for subsequent input blocks to analyze. A similar input collaboration unit 1050 ascertains the best possible output action for a sequence of inputs and feeds it to an agent server 1070. The input event wait queue 1030 is flushed for the input block category and reasoning fed back to a probabilistic inference management base 1035.

Figure 11:
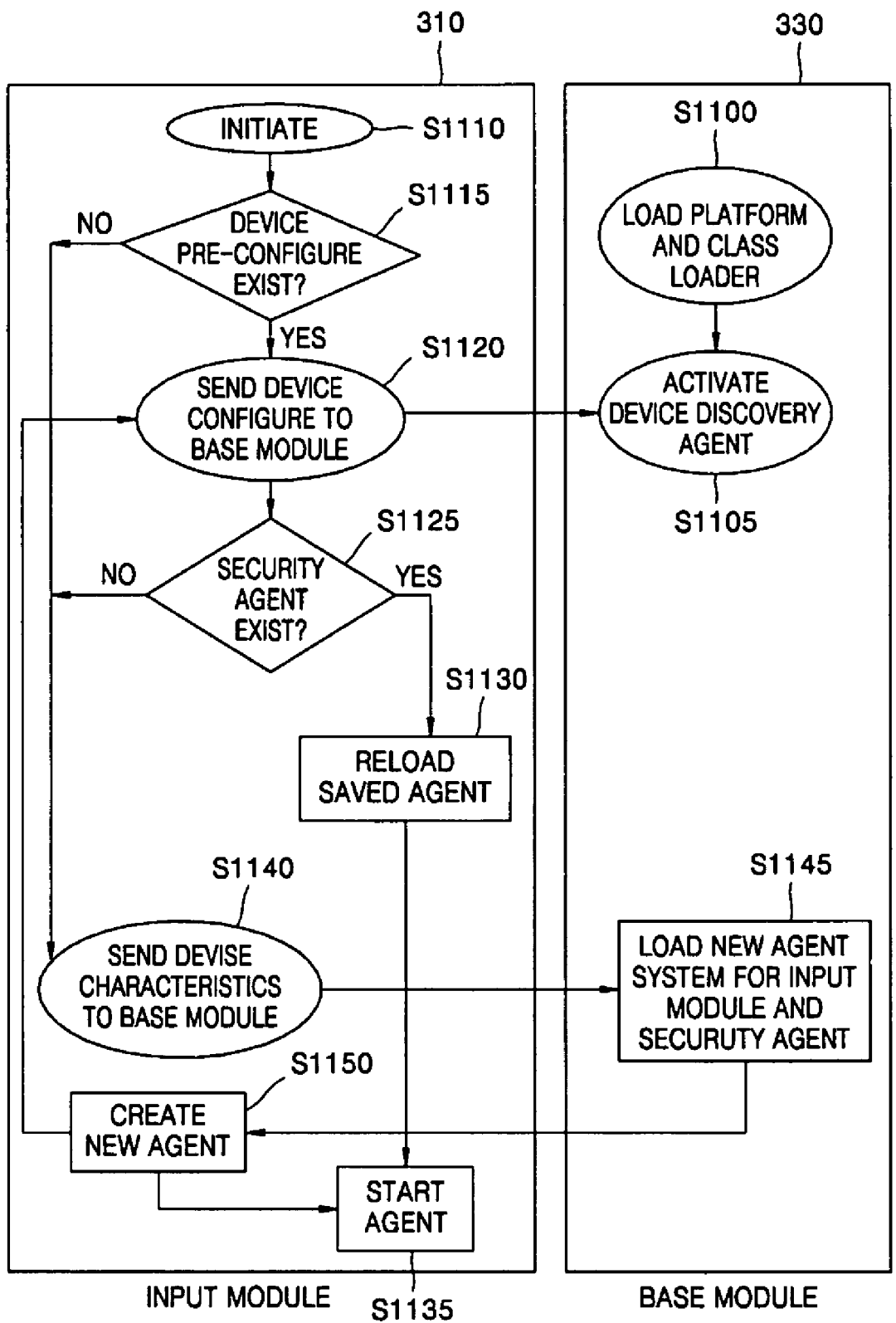
FIG. 11 is a flowchart of a procedure performed by an input module and a base module at the beginning of a method for multi-modal context-sensitive applications according to an embodiment of the present invention.

FIG. 11 is a flowchart of a procedure performed by the input module 310 shown in FIG. 3 and the base module 330 shown in FIG. 3 at the beginning of a method for multi-modal context-sensitive applications according to an embodiment of the present invention. The input module 310 resides on a mobile agent and the base module 330 resides on a base agent.

Referring to FIG. 11, in operation Si 100, the initiation agent 344 in the base module 330 loads a platform and a class loader. In addition, the initiation agent 344 starts the device discovery agent 342 that waits for inputs from the input module 310 that are active. In operation S1110, the input module 310 on the mobile agent on power up starts an initiation procedure. In operation S1115, the input module 310 checks to see if any previous device configurations exist. If a previous device configuration exists, in operation S1120, the input module 310 sends the previous device configuration to the base module 330. The device discovery agent 342 in the base module 330 notifies information received from the input module 310 to the security agent 340 for authentication procedures. Lists of devices are maintained active in the user manager agent 338. Security agent digital signatures may be stored permanently in trusted devices or configured dynamically on startup. In operation S1125, the input module 310 verifies if the security agent 318 exists therein. If the security agent 318 exists in the input module 310, in operation S1130, a saved agent is reloaded. In operation S1135, the reloaded agent begins to load input agents to start operation. A default security profile is loaded on startup.

If any previous device configuration or the security agent 318 does not exist, in operation S1140, the input module 310 sends device characteristics to the base module 330 supporting the input module 310. In operation S1145, the base module 330 receiving the device characteristics loads a new agent system for the input module 310 and a new security agent. In addition, the base module 330 creates a new mobile agent interface and sends a device configuration to the device discovery agent 342. In operation S1150, the input module 310 creates a new agent.

Figure 12:
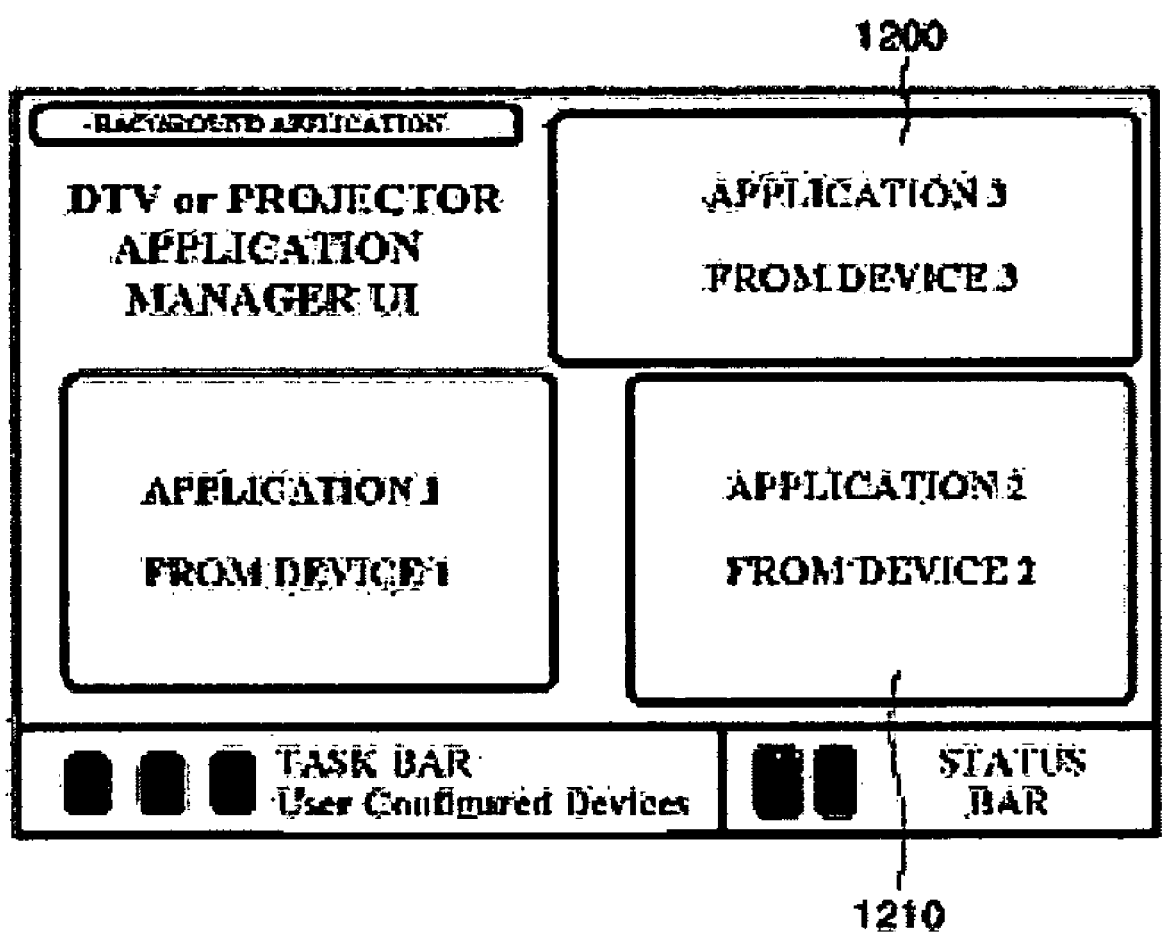
FIG. 12 illustrates a sample graphical interface for the configuration of a Talk2TV home server.

FIG. 12 illustrates a sample graphical interface for the configuration of a Talk2TV home server. A user can configure several devices as icons on a computer screen 1200 and dynamically activate and deactivate inputs on devices configured to be a part of the user's home domain. The user can also view a display on another display device connected to the home server configured for the user's domain 1210.

FIG. 13 illustrates a table of possible input configuration available to a user. The PROFILE column denotes various profiles configured to operate in the user's domain. The user can have a private profile, a family profile, a general profile, or other profiles by default. Users can also dynamically configure their own profiles based on their needs. The INPUT TYPE column denotes input types available for the user's domain. The available input types include a speech input, a camera input, a localization input, a text input, and other inputs configured for the user. Users can assign a priority to each input type based on their needs. A default option may issue the highest priority to the speech input if available. It is to be noted that ranking is a system-defined table of input type quality. If the quality of the speech input is bad and the system cannot identify a command issued clearly from the possibilities, a low ranking of 0 is issued to a particular input type. Ranking varies from a low value of 0 to a high value of 3 based on input type quality.

The INPUT DEVICE column defines input devices available to the user for configuration in the user's profile. Different input devices can be enabled/disabled based on users choices. Only one input device can be enabled for most inputs like speech. Camera and localization inputs are configured for acceptance from multiple devices.

Figure 14:
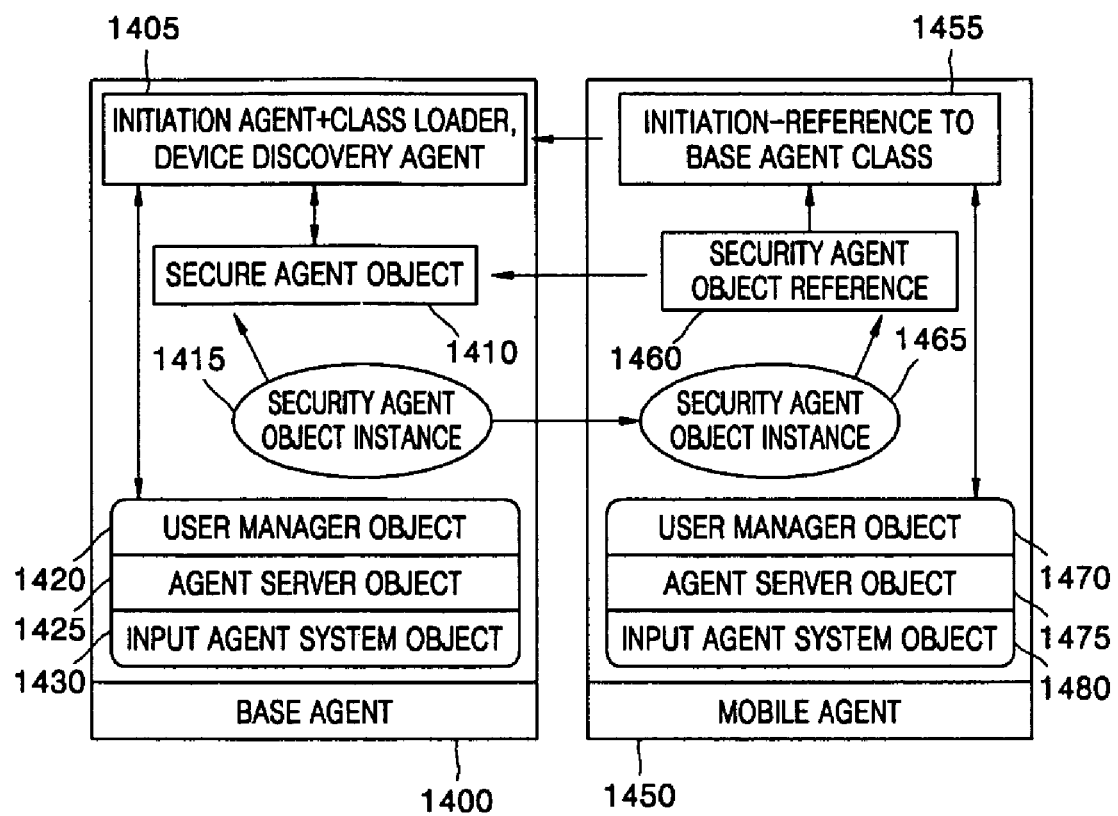
FIG. 14 illustrates operations between the base agent and the mobile agent for a startup.

FIG. 14 illustrates operations between a base agent 1400 and a mobile agent 1450 for startup. An initiation agent/class loader/device discovery agent 1405 is started in the base agent 1400. The device discovery agent waits for initiation signals from all mobile agent devices 1455. A security agent creates a security agent object 1410 for the base agent 1400 and a security agent object reference 1460 corresponding to the security agent object 1410 for the mobile agent 1450. Security agent object instances 1415 and 1465 are created for the base agent 1400 and the mobile agent 1450, respectively, and interface with each other. Other objects 1420, 1425, and 1430 in the base agent 1400 and other objects 1470, 1475, and 1480 in the mobile agent 1450 are subsequently created and initialized.

A sample class definition for the device discovery agent is coded as follows:

```
Sample Class definition for DeviceDiscoveryAgent
class DeviceDiscoveryAgent
{
    private:
        DeviceDiscoveryAgent( );
        ~DeviceDiscoveryAgent( );
        void init( ); // initiation function
    public:
        void addDeviceConfig( ); // add the device config
        void updateDeviceConfig( ); // update the device config
        void removeDeviceConfig( ); // remove the device config
};.
```

Thus defined agent has three public methods to facilitate addition of device configuration, update of the device configuration, and deletion of the device configuration.

Figure 15:
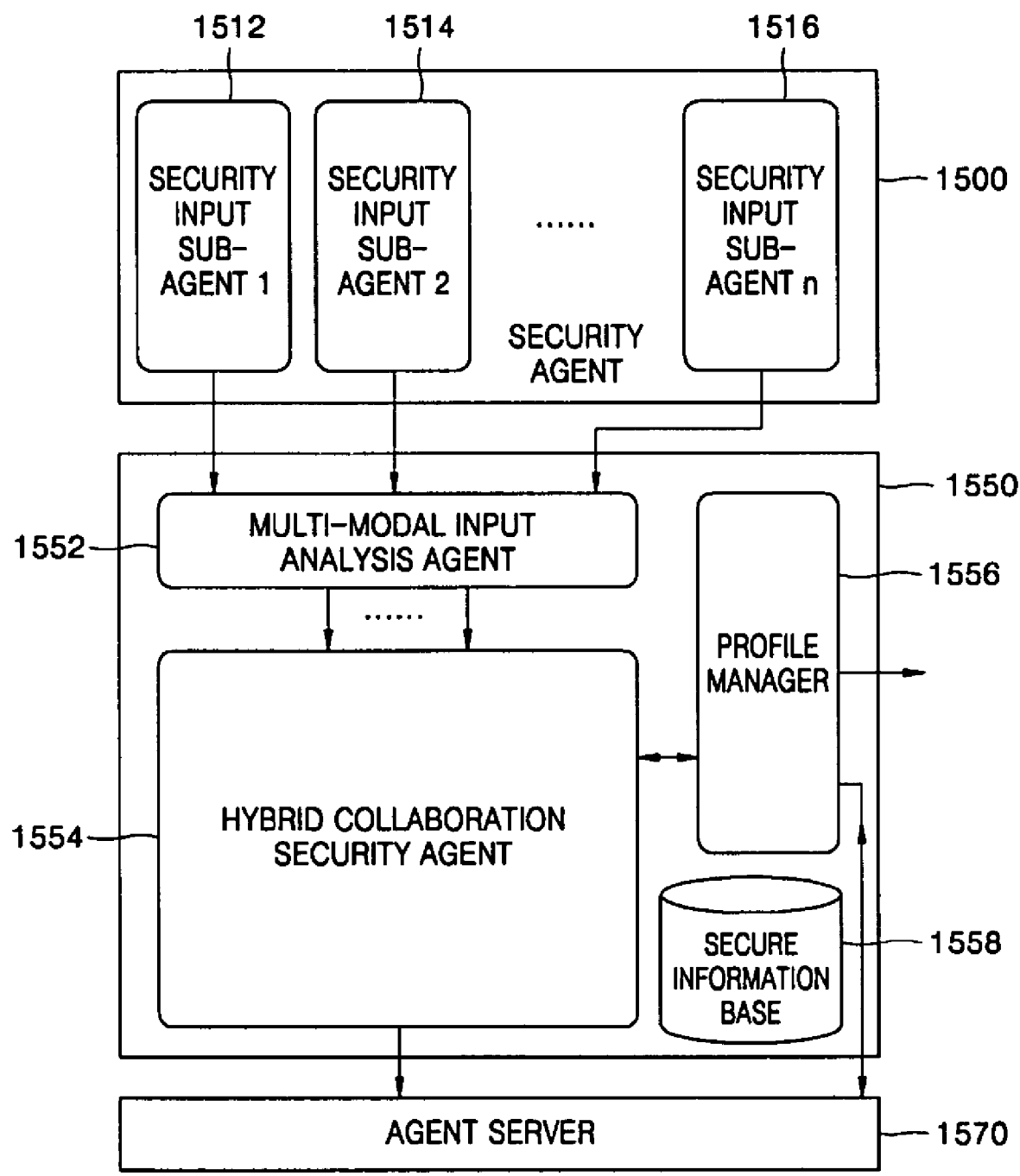
FIG. 15 illustrates operations of a security agent and a user manager agent.

FIG. 15 illustrates operations of a security agent 1500 and a user manager agent 1550. A plurality of security input sub-agents 1512, 1514, and 1516 included in the security agent 1500 are configurable for a device and a user based on the user's context activated on startup. These security input sub-agents 1512, 1514, and 1516 provide individual inputs for identifying the user and facilitating authentication, authorization and confidentiality. The individual inputs obtained by the security input sub-agents 1512, 1514, and 1516 are analyzed by a multi-modal input analysis agent 1552 included in the user manager agent 1550, and corresponding outputs are fed to a hybrid collaboration security agent 1554. The multi-modal input analysis agent 1552 receives all security inputs and categorizes the inputs into classes correspond to users domain. Only inputs corresponding to a current user domain are fed to the hybrid collaboration security agent 1554. The hybrid collaboration security agent 1554 performs collaborative analysis to obtain the best possible means of output action and feeds an output to an agent server 1570 and a profile manager 1556. The profile manager 1556 waits for an output from the agent server 1570 corresponding to a user context and maintains respective profile outputs for the users to dynamically adapt to context-sensitive needs of a user. Information related to security contexts and agent digital signatures is maintained in a secure information base 1558. An output from the profile manager 1556 is displayed on a corresponding output device.

Figure 16:
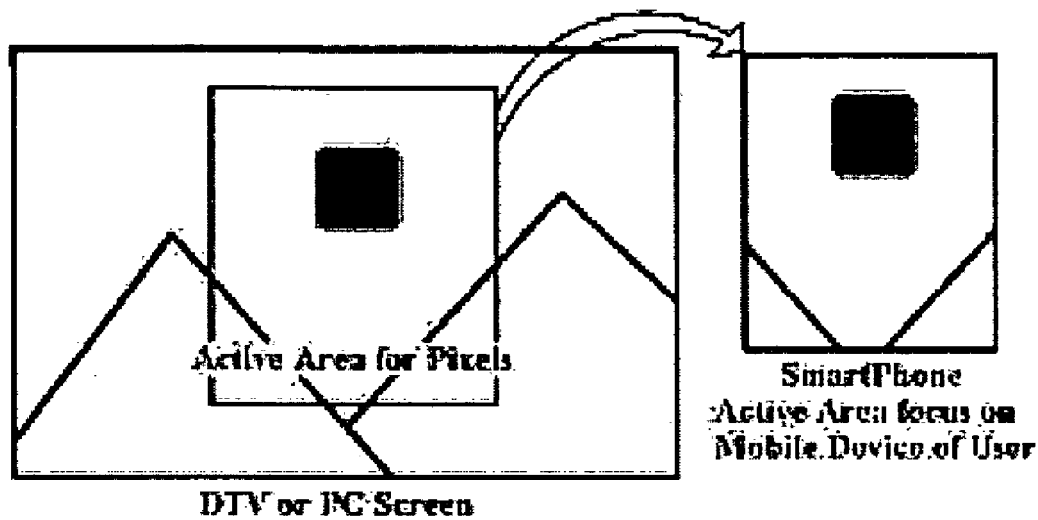
FIG. 16 illustrates an example of use of a dynamic adaptive context for a smartphone.

FIG. 16 illustrates an example of use of a dynamic adaptive context for a smartphone. A gaming user needs a feed of only an output that constantly changes with respect to the context of some games and may configure a user output to be displayed on the smartphone as shown in FIG. 16. This feature is extremely useful to facilitate small display devices to enrich the facilities offered by their bigger cousins.

Figure 17:
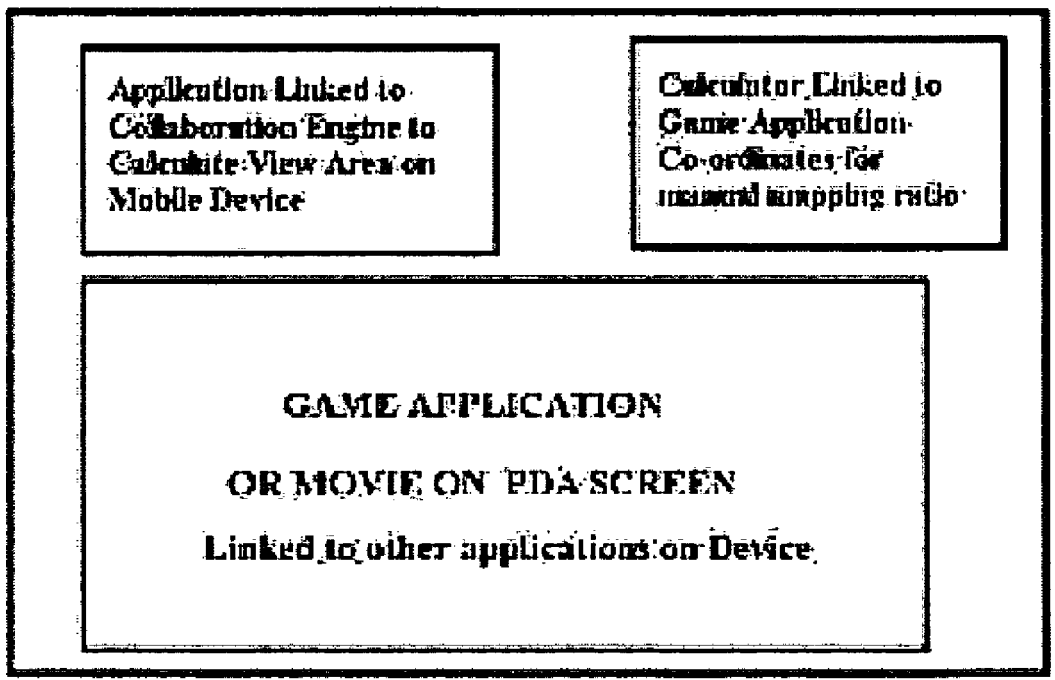
FIGS. 17 and 18 illustrate sample configuration screens for use of a dynamic adaptive context on a personal digital assistant (PDA) and a smartphone, respectively.
Figure 18:
Figure 19:
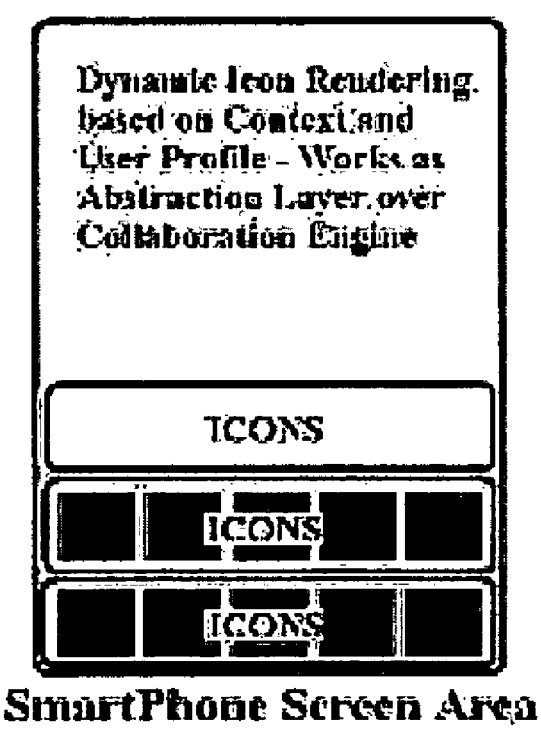
FIG. 19 illustrates one among many significant advantages of a system and method for multi-modal context-sensitive applications in a home network environment according to the present invention.

FIGS. 17 and 18 illustrate sample configuration screens for use of a dynamic adaptive context on a PDA and a smartphone, respectively. FIG. 19 illustrates one among many significant advantages of a system and method for multi-modal context-sensitive applications in a home network environment according to the present invention.

Referring to FIG. 17, an output can be displayed as an individual object and a user can configure user interface to denote moving objects only, which is especially useful when the user plays games on a minuscule screen device. Referring to FIG. 18, a user can easily select a menu displayed on a small smartphone. Referring to FIG. 19, a user can dynamically adapt small display sizes of some devices to adopt to the user's tastes based on context scenarios. This is configured in correspondence with a probabilistic inference database.

As described above, according to the present invention, a user of a smartphone or a PDA with Internet browsing capabilities can dynamically display icons related to news and stocks during the day and icons related to music and movies during the night. This is inferred based on the individual user's usage scenario. The icons rotate at a probability of usage based on previous usage scenarios. The present invention can also adapt to new technology devices to display the technology trends of a plurality of applications based on a user's individual choices and preferences inferred by a method and apparatus according to embodiments of the present invention.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion.

The present invention enables the way that human-computer interaction occurs in a traditional home environment to dynamically adapt to the next generation input and security requirements and facilitates security identification to prevent unauthorized usage and prevent crimes that occur unnoticed at homes. In addition, the present invention enables users to make multi-modal inputs for both user input data and security context. The present invention uses a hybrid architecture using parallel processing coupled with real-time analysis to provide the best possible solution to a sequence of user inputs and thereby dynamically changes the configuration of a device including user interface to adapt to a user's requirements and produces an output based on the user's context.

Although a few embodiments of the present invention have been shown and described, it will be understood by those skilled in the art that changes may be made in these elements without departing from the spirit and scope of the invention, the scope of which is defined in the appended claims and their equivalents.

What is claimed is:

1. A system for providing a dynamic user configurable output for multi-modal context-sensitive applications in a home network, the system comprising:

a processor;

a memory couple to the processor;

an input processing agent unit classifying inputs from a predetermined input device based on at least one criterion selected from the group consisting of an input block, an input type, a priority, and ranking and then outputting an input with the highest priority and the highest ranking among the classified inputs;

an input collaboration agent unit obtaining a pre-defined output action for an input type corresponding to each input based on a user's context by performing real-time analysis on each of the inputs fed by the input processing agent unit and obtaining a possible output action based on the user's context by performing a probabilistic inference on the inputs fed by the input processing agent unit;

a user manager agent unit to transmit the current user's profile and a detected user context to the input collaboration agent through an agent server and obtaining a user interface in accordance with an output resource corresponding to the output action determined by the input collaboration agent, wherein the output resource, which is available in the home network and corresponds to the current user's context, is based on the current user's profile and the detected user context; and the agent server obtaining the output resource, which is available in the home network and corresponds to the user's context, based on the output action obtained by comparing the output actions from the input collaboration agent.

2. The system of claim 1, wherein the input processing agent unit feeds the inputs received from an input agent unit comprising at least one among a speech input sub-agent, a camera input sub-agent, sketch input sub-agent, and a text input sub-agent to the input collaboration agent sequentially according to priorities assigned to the inputs and rankings determined based on quality of the inputs.

3. The system of claim 1, wherein the input collaboration agent unit comprises:

a real-time analysis agent unit obtaining a pre-defined output action for an input type corresponding to each input based on a current input category, a current input value, a previous input category, a previous input value, a previous output action, a current context, and a previous context;

a multi-modal input analysis agent unit performing the probabilistic inference on the inputs fed by the input processing agent to obtain the possible output action to be taken for a sequence of the inputs, a previous action, a similar previous sequence of inputs, and current and previous contexts associated with the inputs; and a hybrid collaboration architecture accepting the inputs based on an input block, an input category, an input type, a current context, and a corresponding input string from the multi-modal input analysis agent and performing a reactive inference and a probabilistic inference on the accepted inputs to obtain the possible output action for the inputs.

4. The system of claim 3, wherein the hybrid collaboration architecture comprising:

a reactive inference unit performing reactive inference based on the inputs from the multi-modal input analysis agent;

a probabilistic inference unit performing probabilistic inference corresponding to the inputs from the multi-modal input analysis agent based on the inference result of the reactive inference unit;

a query best action unit performing query a best possible output action to the inputs from the multi-modal input analysis agent based on the inference result obtained by the sequential inference operation of the reactive inference unit and the probabilistic inference unit; and a similar input collaboration unit ascertaining the best possible output action for the inputs from the multi-modal input analysis agent and outputting the best possible output action to the agent server.

5. The system of claim 1, further comprising:

a security agent unit authenticating a current user and detecting a profile and a context that correspond to the authenticated current user.

6. The system of claim 1 or 5, further comprising a device discovery agent unit discovering devices connected to the home network and obtaining configuration information regarding the devices.

7. The system of claim 1 or 5, further comprising a user interface agent unit storing the user's profile and context and adding a new profile and context based on the user's needs.

8. A method of providing a dynamic user configurable output for multi-modal context-sensitive applications in a home network, the method comprising:

(a) classifying inputs from a predetermined input device based on at least one criterion selected from the group consisting of an input block, an input type, a priority, and ranking and then outputting an input with the highest priority and the highest ranking among the classified inputs;

(b) obtaining a pre-defined output action for an input type corresponding to each input based on a user's context by performing real-time analysis on each of the inputs and obtaining a possible output action based on the user's context by performing a probabilistic inference on the inputs using a computer;

(c) obtaining an output resource, which is available in the home network and corresponds to the user's context, based on the output action obtained by comparing the output actions obtained in the step (b);

(d) authenticating the user and detecting a user's profile and a user's context that correspond to the authenticated user; and (e) obtaining a user interface in accordance with the output resource, which is available in the home network, wherein the output resource corresponds to the user's context, based on the detected user's profile and the detected user's context.

9. The method of claim 8, wherein the predetermined input device comprises at least one among a speech input agent, a camera input agent, sketch input agent, and a text input agent, and the outputting of the classified inputs comprises sequentially outputting the inputs according to priorities assigned to the inputs and rankings determined based on quality of the inputs.

10. The method of claim 8, further comprising (f) discovering devices connected to the home network and obtaining configuration information regarding the devices.

11. The method of claim 8, further comprising (g) storing the user's profile and context and adding a new profile and context based on the user's needs.

12. The method of claim 8, wherein the step (b) comprising:

(b1) performing reactive inference based on the inputs from the input device;

(b2) performing probabilistic inference corresponding to the inputs from the input device based on the inference result of the reactive inference;

(b3) performing query a best possible output action to the inputs from the input device based on the inference result obtained by the reactive and probabilistic inference operation performed sequentially; and (b4) ascertaining the best possible output action for the inputs from the input device and outputting the best possible output action.

* * * * *